United States Patent [19]

Boodaghains et al.

[11] Patent Number: 5,073,578

[45] Date of Patent: Dec. 17, 1991

[54] CORE-SHELL COPOLYMER EMULSIONS FOR FLEXIBLE COATINGS

[75] Inventors: Razmik B. Z. Boodaghains, Sutton; Colin G. Fuller; Aloysius G. Meredith, both of Surrey, all of England

[73] Assignee: Unilever Patent Holdings B.V., Rotterdam, Netherlands

[21] Appl. No.: 658,922

[22] Filed: Feb. 21, 1991

[30] Foreign Application Priority Data

Feb. 23, 1990 [EP] European Pat. Off. ........... 90301973

[51] Int. Cl.$^5$ ..................... G08L 83/07; C08F 275/00
[52] U.S. Cl. ..................................... 523/201; 525/288
[58] Field of Search .................... 523/201; 525/288

[56] References Cited

U.S. PATENT DOCUMENTS

| | | | |
|---|---|---|---|
| 4,569,964 | 2/1986 | Lee et al. | 524/460 |
| 4,616,057 | 10/1986 | Lindemann et al. | 524/458 |
| 4,683,165 | 7/1987 | Lindemann et al. | 428/290 |
| 4,883,189 | 5/1989 | Miyazono et al. | 525/274 |
| 4,942,086 | 7/1990 | Mudge et al. | 428/290 |
| 4,975,320 | 12/1990 | Goldstein et al. | 428/288 |

FOREIGN PATENT DOCUMENTS 0256500  2/1988  European Pat. Off. .

*Primary Examiner*—Paul R. Michl
*Assistant Examiner*—Peter Szekely
*Attorney, Agent, or Firm*—Ellen T. Dec

[57] ABSTRACT

Emulsion copolymers having a core-shell structure with alkyl alkanoate, alkylene, alkyl acrylate and vinyl silane in the core and vinyl alkanoate in the shell are usable in pigmented surface coating compositions. These compositions have desired water permeability tensile strength and elongation properties at low temperatures. The compositions provide bridging for cracks present or developing in the surface.

10 Claims, No Drawings

CORE-SHELL COPOLYMER EMULSIONS FOR FLEXIBLE COATINGS

FIELD OF THE INVENTION

This invention relates to copolymer emulsions suitable for use as thick flexible coatings for concrete, brick, bitumen felt and other surfaces. They are usable on vertical, horizontal and sloping surfaces.

BACKGROUND TO THE INVENTION

The use of flexible coatings to protect surfaces from damage whether by physical or chemical means is well known. Such surface coatings will be expected to provide a decorative appearance when used internally or externally.

The invention provides copolymer emulsions suitable for incorporation in surface coatings. These coatings are sufficiently flexible to provide bridging across any cracks that may develop in the substrate due to movement and the products of the invention are effective even at relatively low temperatures. They possess the necessary combination of water retention and permeability properties.

General description of the invention

The invention provides a copolymer emulsion comprising a core/shell structure in which the core comprises by weight:
i) from about 10% to about 60% of vinyl C1 to C4 alkanoate,
ii) from about 10% to about 30% of C2 to C4 alkylene,
iii) from about 1% to about 10% of alkyl (C2 to C12) acrylate
iv) from about 10% to about 40% of vinyl esters having the general formula $R_1R_2R_3CCOOCHCH_2$ wherein $R_1$ $R_2$ and $R_3$ are each alkyl groups having at least one carbon atom and $R_1+R_2+R_3$ have from 6 to 9 carbon atoms (vinyl versatates),
v) from about 0.1% to about 5% by weight of a vinyl silane and
vi) the shell, which comprises from about 5% to about 40% by weight of the total copolymer solids, comprises vinyl C1 to C4 alkanoate at a level of at least 80%.

The copolymer will have a Tg in the range about 0° C. to about −30° C., preferably −5° C. to −20° C. The Tg is obtained within a suitable range by selection of the monomers and their content. Tg of a copolymer may be calculated from the monomer values or measured using Dynamic Mechanical Thermal Analysis (DMTA).

The solids contents of the emulsions will usually be in the range 35% to 70% by weight, preferably 45% to 60% to provide cost effective provision of the film forming solids.

The weight mean particle size of the emulsion particles will usually be in the range 0.5 to 3.0 microns as measured by using a Joyce Loebl disc centrifuge.

Although vinyl acetate is the preferred vinyl alkanoate monomer because of its availability, cost and known reactivity, other vinyl esters within the class defined are usable, in particular vinyl formate, propionate, butyrate and isobutyrate. The vinyl alkanoate monomer will be present at a level of about 10% to ensure the copolymer has the desired properties and amounts above about 60% are unlikely to be cost effective, preferably a level above about 40% will be used.

The preferred alkylene is ethylene but other ethylenic hydrocarbons, for example propylene butylene and isobutene are usable. Preferably the level is above about 15%.

The alkyl acrylate monomers are present to provide physical softening of the copolymers and are preferably present at a level above about 3% and below about 8%. The chain length of the alkyl group is preferably in the range 4 to 10. A preferred alkyl acrylate is 2-ethyl hexyl acrylate but butyl acrylate, hexyl acrylate and octyl acrylate are also satisfactory.

The vinyl esters of versatic acids are obtained from Shell Chemicals of Chester England under the Trade Mark "Veova". The preferred levels of vinyl versatates are from about 15% and to about 30% of the monomer composition. The presence of these monomers permits balancing of the polymer Tg and improves alkaline hydrolysis resistance.

The vinyl silane is preferably present at a level of up to about 2% for cost effectiveness. The vinyl silanes have the general formula $CH_2=CH-Si(OX)_3$ wherein X represents separately hydrogen, acyl, an unsubstituted alkyl radical or an alkoxy substituted alkyl radical with, at most, two of the X radicals being hydrogen. Examples of these silanes are vinyl triethoxy silane, vinyl trimethoxy silane, vinyl-tris (beta-methoxy ethoxy) silane and vinyl triacetoxy silane.

The presence of the alkyl acrylate and vinyl silane components together provide the desired balance between tensile strength and elongation, particularly at low temperatures.

Functional monomers may be included in the shell, for example monomers capable of hardening the total emulsion such as vinyl pivalate and dimethyl maleate. These hardening monomers may be present at a level of 0 to 20% by weight of the shell, with the desired characteristics being obtained at a cost/effective level usually in the range 5% to 10%. Hardening monomers may also be included in the core to provide the desired product features. Preferably the alkylene content of the shell is kept as low as possible.

Methods for preparing the copolymer emulsions of the invention are well characterised in the literature. Polymer synthesis (vols I and III) by Sandler & Karo (Academic Press 1974) and Preparative Methods of Polymer Chemistry (2nd Ed) by Sorenson and Campbell (Interscience 1968) provide preparative information. Methoden der Organischen Chemie (Houben-Wey) Band XIV published by George Thieme Verlag Stuttgart (1961) also provides preparative descriptions.

The copolymer emulsions of the invention are usable in paints intended for surface coatings; these compositions will usually comprise (by weight):
i) 3% to 35% dry weight copolymer solids,
ii) 5% to 35% aqueous phase including water present in emulsion,
iii) 5% to 55% filler, and
iv) 5% to 30% pigment

| Pigmented compositions of use as roof treating compositions usually comprise (by weight of solids): | |
|---|---|
| Thickener eg cellulose ether | 1.5 to 3.5% |
| Dispersant eg sodium polyphosphate | 0.75 to 2.0% |
| Preservative | 0.05 to 0.2% |
| Defoamer | 0.1 to 0.3% |
| Pigment | 5 to 30% |
| Filler | 5 to 55% |
| Coalescing solvent eg alcohol ester | 1 to 3% |

-continued

| Pigmented compositions of use as roof treating compositions usually comprise (by weight of solids): | |
|---|---|
| Emulsion copolymer dry solids | 3 to 35% |
| Water, including emulsion aqueous base | remainder |

The fillers will include quartz powder, kaolin, silica and milled minerals; the pigments include titanium dioxide, zinc oxide and zinc sulphide.

The coatings formed by these compositions have water uptake level which allows response to changing weather conditions. A water uptake which is too high can lead to disintegration as the coating becomes spongy. At the other extreme a highly water resistant coating will not allow moisture between it and the substrate to escape with consequent damage from moisture retention or freezing.

These coatings will be applied by conventional means, for example, by spray, bush or roller. They are usable in protection or repair situations.

Test methods

The following procedures were used to test emulsions prepared according to the invention.
 i) Tensile strength/elongation: An emulsion sample centrifuged to remove air was drawn down to a 0.63 mm film on a ptfe coated glass plate and dried for 7 days at 21° C. and 65% relative humidity. For room temperature testing 1 cm by 5 cm test samples were prepared and mounted on a cardboard mount. The mounted specimen was clamped between a pair of jaws spaced 3 cm apart of an Instron apparatus and the jaws separated at 50 cm/min. Wet tests were performed on specimen dried films immersed in water at 21° C. for 24 hours before mounting.
Tests were performed over a range of temperatures by using an Instron environment cabinet.
 ii) The tensile strength/elongation tests on pigmented products were performed using procedure (i) but with a wet drawn down film of 0.25 mm thickness.
 iii) Water uptake: Dried (5 cm×5 cm) films of the emulsion or pigmented product were prepared as in methods (i) or (ii) and immersed in water at 21° C. Water uptake was determined by weighing after 1 day and 7 days.

When reporting the elongation results the use of a + sign indicates the sample did not break at the maximum extension available with the machine at the test conditions.

Specific description of the invention

Copolymer emulsions were prepared to illustrate the invention.

EXAMPLE 1

| | % wt. |
|---|---|
| Vinyl Acetate ⎫ | 39.00 |
| VeoVa 9* ⎬ monomer | 25.00 |
| 2-Ethylhexyl Acrylate ⎬ phase 1 | 5.00 |
| Silane A172** ⎭ | 1.00 |
| Vinyl Acetate (monomer phase 2) | 10.00 |
| Ethylene | 20.00 |
| Stabilising System | |
| Natrosol 250 LR*** | 1.00 |
| Perlankrol FN 65**** | 3.08 |
| Initiator System | |
| Sodium persulphate | 0.45 |

| | % wt. |
|---|---|
| Formaldehyde sulphoxylate (Formosul) | 0.28 |
| Finishing off stage | |
| t-butyl hydroperoxide | 0.30 |
| Sodium metabisulphite | 0.20 |
| Tg (°C.) | −8.0 |

*a vinyl ester of versatic acid in which $R_1 + R_2 + R_3$ is 7.
**vinyl-tris (beta-methoxyethoxy) silane obtainable from Union Carbide of USA.
***hydroxy ethyl cellulose obtainable from Hercules Chemicals Ltd of London England.
****sodium nonyl phenol 20EO sulphate obtainable from Lankro Chemicals of Manchester England.

The Natrosol 250 LR (54 gm.) and the 65% aqueous solution of Perlankrol FN65 (166.2 gm.) were dissolved in deionised water (3700 gm) at 50° C. The solution was then cooled to 30° C. and the pH adjusted with formic acid. The ferric chloride and 3.5% of the Formosul (0.5 gm.) was added and the water phase immediately loaded to a stirred 10 litre reactor.

The reactor (at 30° C.), was purged twice with nitrogen to 7 Bar (guage) and then once with ethylene to 7 Bar (guage). 25% of monomer phase 1 (945 gm.) and 70% of the ethylene (756 gm.) were then added and the internal temperature stabilised at 30° C.

The continuous additions of the remainder of monomer phase 1 and the initiators (24.3 gm. of sodium persulphate and 14.6 gm. of Formosul each in 625 gm. of deionised water) was then commenced. The initiators were added over seven hours with the first quarter hour and last half hour at double rate, and the monomer over five hours. The internal temperature was allowed to rise to 55° C. over the first 30 minutes of additions and was then maintained at 54°-56° C. until the end of the continuous additions. At 55° C. the reactor pressure was increased and maintained at 65 Bar (guage) until the remainder of the ethylene had been added (approximately two hours). When monomer phase 1 addition was complete, monomer phase 2 (540 gm.) was added over one hour. When all additions were added the reaction mass was cooled to 50° C. and the finishing off stage (16.2 gm of t-butyl hydroperoxide and 10.8 gm. of sodium metabisulphite each in 150 gm. of deionised water) was added to the reactor in separate streams over thirty minutes whilst cooling the emulsion to 30° C. The emulsion was then discharged to a degassing tank. The solids content was 50% and weight means particle size 1.5 micron.

The tensile strength and elongation of this emulsion were measured and the results given in Table I.

TABLE I

| Temperature (°C.) | Tensile Strength ($Kg/cm^2$) | | Elongation (%) | |
|---|---|---|---|---|
| | Dry | Wet | Dry | Wet |
| 21 | 6.1 | 1.8 | 2150 | 1465 |
| 0 | 35.8 | NM | 339 | NM |
| −5 | 37.3 | NM | 339 | NM |
| −10 | 37.5 | NM | 254 | NM |

NM - Not measured as wet properties cannot be measured below 0° C.

EXAMPLE 2

(comparison)

Copolymer emulsions A, B and C were prepared using the procedure of Example 1. They were subjected to the tensile strength and elongation tests described previously at a number of temperatures (room temperature 21° C.).

The compositions of A, B and C were (by weight):

|  |  | A | B* | C |
|---|---|---|---|---|
| Vinyl acetate |  | 35 | 34.5 | 40 |
| Veova 9 | Phase 1 | 25 | 25 | 25 |
| 2 ethyl hexyl acrylate |  | 5 | 5 | None |
| Silane A172 |  | none | 0.5 | None |
| Vinyl acetate (Phase 2) |  | 10 | 10 | 10 |
| Ethylene |  | 25 | 25 | 25 |
| Tg (°C.) |  | −10 | −10 | −6.5 |

*B was a composition according to the invention having solids content of 50% and weight mean particle size of 0.74 micron.

The change in Tg for composition C is not unexpected because the composition has been balanced for comparison purposes. The properties of these emulsions are given in Tables II and III. The benefit obtained by including the vinyl silane in emulsion B is clearly seen and comparison of B and C shows the benefit of including the vinyl silane and alkyl acrylate together.

TABLE II

| Room Temperature Testing Tensile Strength (Kg/cm$^2$) | | | | | |
|---|---|---|---|---|---|
| Dry | | | Wet | | |
| A | B | C | A | B | C |
| 1.8 | 3.4 | 2.1 | 0.7 | 1.5 | 1.1 |

The three emulsions were satisfactory on elongation to the limits of the test machine.

TABLE III

| | Low Temperature Testing | | | | | |
|---|---|---|---|---|---|---|
| | Tensile strength (Kg/cm$^2$) | | | Elongation (%) | | |
| Temperature | A | B | C | A | B | C |
| 0° C. | 18.9 | 23.2 | 38.1 | 350 | 350 | 350 |
| −5° C. | 36.3 | 38.2 | 37.6 | 350 | 350 | 275 |
| −10° C. | 41.0 | 43.0 | 38.2 | 266 | 275 | 258 |
| −15° C. | 40.7 | 42.5 | 40.5 | 175 | 225 | 158 |

These lower temperature results show the benefits obtained by incorporating vinyl silane and alkyl acrylate together.

EXAMPLE 3

(comparison)

Copolymer emulsions D and E were prepared using the procedure of Example 1 with the exception that all the ethylene charge was introduced initially. The compositions of D and E were (by weight):

|  |  | D | E* |
|---|---|---|---|
| Vinyl acetate |  | 49 | 39 |
| Veova 9 | Phase 1 | 25 | 25 |
| 2 ethyl hexyl acrylate |  | 5 | 5 |
| Silane A172 |  | 1 | 1 |
| Vinyl acetate (Phase 2) |  | none | 10 |
| Ethylene |  | 20 | 20 |
| Tg (°C.) |  | −7.5 | −8.0 |

*E was a composition according to the invention having a solids content of 50% and a weight mean particle size of 2.5 micron.

The properties of these emulsions are given in Tables IV & V.

TABLE IV

| Room Temperature Testing | | | | | | | |
|---|---|---|---|---|---|---|---|
| Tensile strength (Kg/cm$^2$) | | | | Elongation % | | | |
| Dry | | Wet | | Dry | | Wet | |
| D | E | D | E | D | E | D | E |
| 10.1 | 7.9 | 5.4 | 8.7 | 1000 | 1033 | 1375 | 1733 |

The presence of the shell formed by the phase 2 vinyl acetate is seen to improve the wet characteristics of the emulsion.

TABLE V

| | Low Temperature Testing | | | |
|---|---|---|---|---|
| Temperature | Tensile strength kg/cm$^2$ | | Elongation % | |
| Example | D | E | D | E |
| 0° C. | 32.5 | 43.8 | 350+ | 350+ |
| −5 | 32.6 | 43.4 | 350+ | 350 |
| −10 | 32.1 | 43.1 | 300 | 275 |
| −15 | 34.2 | 46.0 | 275 | 170 |

The presence of the shell is seen to give considerable improvement to the tensile strength at these lower temperatures while the elongation, although reduced, is still at a satisfactory level.

EXAMPLE 4

(comparison)

The effect of vinyl silane at a level of 1% was investigated by comparing composition E from Example 3 with a composition F containing no vinyl silane and with 40% vinyl acetate in the core. The ethylene charge was introduced initially but otherwise the procedure of Example 1 was followed. Composition E had a Tg of −8.0° C. and composition F a Tg of −7.0° C.

The properties of these emulsions are given in Tables VI and VII

TABLE VI

| Room Temperature Testing | | | | | | | |
|---|---|---|---|---|---|---|---|
| Tensile strength (Kg/cm$^2$) | | | | Elongation % | | | |
| Dry | | Wet | | Dry | | Wet | |
| F | E | F | E | F | E | F | E |
| 2.1 | 7.9 | 1.0 | 8.7 | 2166+ | 1033 | 2166+ | 1733 |

TABLE VII

| | Low Temperature Testing | | | |
|---|---|---|---|---|
| Temperature | Tensile strength kg/cm$^2$ | | Elongation % | |
| Example | F | E | F | E |
| 0° C. | 28.7 | 43.8 | 350+ | 350+ |
| −5 | 34.4 | 43.4 | 350+ | 350 |
| −10 | 33.5 | 43.1 | 283 | 275 |
| −15 | 34.7 | 46.0 | 241 | 170 |

Thus the presence of the vinyl silane has a clear effect on the tensile strength while retaining effective elongation properties.

EXAMPLE 5

Compounds containing pigments and intended for roof treatment were prepared using a standard test commercial formulation and emulsions of the invention. The test roofing compound had the composition in parts by weight:

| Materials | Parts by Weight |
|---|---|
| (i) Bermocoll E3209 (5% soln) | 56 |
| (ii) Calgon S (5% soln) | 25 |
| (iii) Acticide MPM | 1 |
| (iv) Hercules 1512 M | 2 |
| (v) Tioxide RCR 2 | 176 |
| (vi) Queensfil 25 | 124 |
| (vii) Texanol | 20 |
| Water | 48 |
| Emulsion | 548 |

(i) Thickener. Ethyl hydroxyethyl cellulose. Obtainable from Berol Kemi (UK) Ltd., Watford, England.
(ii) Dispersant. Sodium polyphosphate. Obtainable from Albright and Wilson, Phosphate Group, Trinity St., Oldbury, Warley, England.
(iii) Mercurial biocide. Obtainable from Thor Chemicals UK Ltd., Cheadle Hulme, England.
(iv) Defoamer. Obtainable from Hercules Chemicals Ltd., London, England.
(v) Titanium dioxide. Obtainable from Tioxide UK Ltd., Billingham, England.
(vi) Extender. Obtainable from ECC International Ltd., St. Austell, England.
(vii) Coalescing agent. Obtainable from Eastman Chemicals International A.G., Hemel Hempstead, England.

The emulsions of the invention, i.e. Example I and compositions B and E, were formulated into the above roofing compound together with composition F as comparison. The tensile strength and elongation were measured and are given in Table VIII.

TABLE VIII

| Emulsion | E | F | B | Ex 1 |
|---|---|---|---|---|
| Tensile strength (Kg/cm$^2$) | | | | |
| 21° C. dry | 10.8 | 3.0 | NM | 14.6 |
| 21° C. wet | 5.7 | 1.6 | NM | 6.3 |
| 0° C. | 58.0 | 28.3 | NM | 53.6 |
| −5° C. | 92.0 | 72.9 | 32.5 | 92.6 |
| −10° C. | 114.0 | 110.0 | 63.6 | 110.0 |
| −15° C. | 118.0 | 110.0 | 40.1 | 113.6 |
| Elongation (%) | | | | |
| 21° C. dry | 1500 | 2166 | NM | 1350 |
| 21° C. wet | 1116 | 1733 | NM | 833 |
| 0° C. | 350+ | 350+ | NM | 350+ |
| −5° C. | 350 | 350+ | 350 | 343 |
| −10° C. | 207 | 293 | 241 | 250 |
| −15° C. | 92 | 57 | 133 | 66 |
| water uptake (%) | NM | 47 | 28 | 25 |

Comparison of E and F demonstrates the application properties of the emulsions reflect the test results of the emulsions.

The water uptake of the polymer films and films of the pigmented roofing compounds were measured for the four emulsions quoted above; the results are given in Table IX.

TABLE IX

| | Water uptake (%) | |
|---|---|---|
| | Polymer film | Pigmented film |
| Example I | 25 | 10 |
| Composition B | 28 | 11 |
| Composition E | 30 | 11 |
| Composition F | 47 | 17 |

These results demonstrate the reduction in water sensitivity obtained when using the copolymer emulsions of the invention.

What we claim is:

1. A copolymer emulsion, having a Tg in the range from about 0° C. to about −30° C., comprising a core/shell structure in which the core comprises by weight:
   i) from about 10% to about 60% of vinyl C1 to C4 alkanoate,
   ii) from about 10% to about 30% of C2 to C4 alkylene,
   iii) from about 1% to about 10% of alkyl (C2 to C12) acrylate,
   iv) from about 10% to about 40% of vinyl esters having the general formula $R_1R_2R_3CCOOCHCH_2$ wherein $R_1$ $R_2$ and $R_3$ are each alkyl groups having at least one carbon atom and $R_1+R_2+R_3$ have from 6 to 9 carbon atoms,
   v) from about 0.1% to about 5% by weight of a vinyl silane and
   vi) the shell, which comprises from about 5% to about 40% by weight of the total copolymer solids, comprises vinyl C1 to C4 alkanoate at a level of at least 80%.

2. An emulsion as claimed in claim 1 wherein the vinyl alkanoate is present in the range above about 40%.

3. An emulsion as claimed in claim 1 wherein the alkylene monomer is present at a level above about 15%.

4. An emulsion as claimed in claim 1 wherein the alkyl acrylate is present in the range from about 3% to about 8%.

5. An emulsion as claimed in claim 1 wherein the chain length of the alkyl group in the alkyl acrylate is from 4 to 10.

6. An emulsion as claimed in claim 1 wherein the vinyl alkanoate is vinyl acetate.

7. An emulsion as claimed in claim 1 wherein the alkylene monomer is ethylene.

8. An emulsion as claimed in claim 1 wherein the solids content is in the rang 35% to 70% by weight.

9. An emulsion as claimed in claim 1 wherein the shell contains from 0% to 20% by weight of hardening monomer selected from the group consisting of vinyl pivalate and dimethyl maleate.

10. Pigmented surface coating compositions containing an effective amount, preferably from about 3% to about 35% solids, of an emulsion claimed in claim 1.

* * * * *